(12) United States Patent
Pristelski et al.

(10) Patent No.: US 12,437,629 B2
(45) Date of Patent: Oct. 7, 2025

(54) NOTIFYING A USER OF AN EMERGENCY EVENT

(71) Applicant: Honeywell International Inc., Charlotte, NC (US)

(72) Inventors: Jeffrey J. Pristelski, Phoenix, AZ (US); Eric G. Dickinson, Tempe, AZ (US); Andrew L. Macfarlane, Santa Barbara, CA (US); Paul J. Jacobs, Killingworth, CT (US); Todd J. Smith, Tempe, AZ (US)

(73) Assignee: Honeywell International Inc., Charlotte, NC (US)

( * ) Notice: Subject to any disclaimer, the term of this patent is extended or adjusted under 35 U.S.C. 154(b) by 69 days.

(21) Appl. No.: 18/221,618

(22) Filed: Jul. 13, 2023

(65) Prior Publication Data

US 2025/0022360 A1 Jan. 16, 2025

(51) Int. Cl.
*G08B 25/01* (2006.01)
*H04W 76/50* (2018.01)

(52) U.S. Cl.
CPC .......... *G08B 25/016* (2013.01); *H04W 76/50* (2018.02)

(58) Field of Classification Search
CPC .............................. G08B 25/016; H04W 76/50
See application file for complete search history.

(56) References Cited

U.S. PATENT DOCUMENTS

| 6,377,172 | B1 | | 4/2002 | Neer | |
|---|---|---|---|---|---|
| 7,034,678 | B2 | * | 4/2006 | Burkley | G01S 5/0072 340/8.1 |
| 8,116,723 | B2 | * | 2/2012 | Kaltsukis | H04W 76/50 455/403 |
| 8,314,683 | B2 | * | 11/2012 | Pfeffer | G08B 25/016 340/7.3 |
| 8,600,338 | B2 | * | 12/2013 | Perrott | G08B 27/001 455/418 |
| 9,342,975 | B2 | | 5/2016 | Titus et al. | |
| 9,426,638 | B1 | * | 8/2016 | Johnson | G08B 25/016 |
| 9,607,092 | B2 | * | 3/2017 | Kreitler | G06F 16/904 |
| 10,127,777 | B1 | * | 11/2018 | Agrawal | F21S 8/086 |
| 10,171,980 | B2 | | 1/2019 | Friesen | |
| 10,271,196 | B1 | * | 4/2019 | Yanamandra | H04M 1/00 |
| 10,497,250 | B1 | * | 12/2019 | Hayward | G06N 3/088 |
| 10,553,102 | B1 | * | 2/2020 | Gillespie, IV | H04M 1/04 |
| 10,692,361 | B1 | * | 6/2020 | Daly | G08B 27/005 |

(Continued)

FOREIGN PATENT DOCUMENTS

| CN | 209625421 U | * | 11/2019 |
|---|---|---|---|
| KR | 102019455 B1 | | 9/2019 |

(Continued)

*Primary Examiner* — Chico A Foxx (74) *Attorney, Agent, or Firm* — Brooks, Cameron & Huebsch, PLLC (57) ABSTRACT

Devices, systems, and methods for notifying a user of an emergency event are described herein. In some examples, one or more embodiments include an alerting device comprising a memory and a processor to execute instructions stored in the memory to receive event data from a remote computing device, where the event data is associated with an emergency event, and cause an alarm to be output to notify a user of an occurrence of the emergency event based on the received event data, where the alarm is output to a space in which the alerting device is located.

20 Claims, 3 Drawing Sheets

(56) References Cited

U.S. PATENT DOCUMENTS

| | | | |
|---|---|---|---|
| 10,834,482 B2 | 11/2020 | Speicher et al. | |
| 11,528,771 B2 | 12/2022 | Elghazzawi | |
| 11,689,653 B2* | 6/2023 | Martin | H04W 4/90 |
| | | | 455/404.1 |
| 11,706,391 B1* | 7/2023 | Heywood | G08B 25/006 |
| | | | 348/158 |
| 12,089,130 B2* | 9/2024 | Dames | H04W 4/024 |
| 2005/0118512 A1* | 6/2005 | Onuki | H01M 10/0567 |
| | | | 429/336 |
| 2006/0048180 A1* | 3/2006 | Kendall | H04N 21/8146 |
| | | | 348/E7.024 |
| 2007/0279219 A1* | 12/2007 | Warriner | G07C 11/00 |
| | | | 340/539.23 |
| 2008/0191863 A1* | 8/2008 | Boling | G08B 25/007 |
| | | | 340/521 |
| 2009/0138353 A1* | 5/2009 | Mendelson | G01S 5/0226 |
| | | | 342/463 |
| 2009/0160635 A1* | 6/2009 | Bopardikar | H04L 12/2825 |
| | | | 340/531 |
| 2010/0211972 A1* | 8/2010 | Howarter | H04N 21/8146 |
| | | | 725/33 |
| 2011/0071880 A1* | 3/2011 | Spector | H04W 76/50 |
| | | | 340/539.13 |
| 2011/0117878 A1* | 5/2011 | Barash | H04W 4/12 |
| | | | 340/539.12 |
| 2011/0319051 A1* | 12/2011 | Reitnour | H04W 4/185 |
| | | | 342/357.55 |
| 2014/0146171 A1* | 5/2014 | Brady | H04N 7/188 |
| | | | 348/143 |
| 2014/0357214 A1* | 12/2014 | Czaja | H04W 84/045 |
| | | | 455/438 |
| 2014/0365390 A1* | 12/2014 | Braun | H04W 4/023 |
| | | | 705/325 |
| 2014/0368601 A1* | 12/2014 | deCharms | H04N 7/148 |
| | | | 348/14.02 |
| 2015/0024704 A1* | 1/2015 | Titus | H04W 4/02 |
| | | | 455/404.1 |
| 2016/0005306 A1* | 1/2016 | McWhirter | G08B 13/196 |
| | | | 340/539.1 |
| 2016/0353266 A1* | 12/2016 | Winkler | H04W 12/33 |
| 2017/0273116 A1* | 9/2017 | Elghazzawi | G06Q 10/08 |
| 2018/0174430 A1* | 6/2018 | Sieja | G08B 21/0453 |
| 2018/0221645 A1* | 8/2018 | Medema | A61N 1/0484 |
| 2018/0330600 A1* | 11/2018 | Polyakov | G08B 25/14 |
| 2019/0088106 A1* | 3/2019 | Grundstrom | H04W 4/90 |
| 2019/0139383 A1* | 5/2019 | Folsom | G08B 13/19682 |
| 2019/0164413 A1 | 5/2019 | Allen | |
| 2019/0387386 A1* | 12/2019 | Sethi | H04W 4/90 |
| 2020/0090508 A1* | 3/2020 | Baker | G08G 1/081 |
| 2020/0265700 A1* | 8/2020 | Bergman | G08B 25/016 |
| 2020/0364990 A1* | 11/2020 | Stogel | G08B 3/10 |
| 2020/0367040 A1* | 11/2020 | Richardson | H04W 4/90 |
| 2021/0243584 A1* | 8/2021 | Hassan | H04W 4/023 |
| 2021/0377621 A1* | 12/2021 | Kitahara | G08B 21/00 |
| 2022/0076556 A1* | 3/2022 | Lindenau | H04M 11/04 |
| 2022/0141917 A1* | 5/2022 | Sanghavi | H04W 76/50 |
| | | | 455/3.05 |
| 2023/0047318 A1* | 2/2023 | Duran | G08B 25/006 |
| 2023/0154309 A1 | 5/2023 | Eaton | |

FOREIGN PATENT DOCUMENTS

| | | | | |
|---|---|---|---|---|
| WO | WO-2011060388 A1 | * | 5/2011 | ......... G08B 21/0211 |
| WO | WO-2014204378 A1 | * | 12/2014 | ......... H04L 12/1895 |
| WO | WO-2023212279 A1 | * | 11/2022 | ......... H04W 4/023 |

* cited by examiner

NOTIFYING A USER OF AN EMERGENCY EVENT

TECHNICAL FIELD

The present disclosure relates to devices, systems, and methods for notifying a user of an emergency event.

BACKGROUND

A first responder may be a person who is designated and/or trained to respond to an emergency event. Such an emergency event may include, for instance, an accident, a disaster, medical emergency, fire, crime, among other emergency events. The first responder may have received specialized training and may be among the first to arrive at an emergency event in order to provide assistance and/or incident resolution. First responders may include firefighters, paramedics, emergency medical technicians (EMTs), law enforcement officers, etc.

DETAILED DESCRIPTION

Devices, systems, and methods for notifying a user of an emergency event are described herein. In some examples, one or more embodiments include an alerting device comprising a memory and a processor to execute instructions stored in the memory to receive event data from a remote computing device, where the event data is associated with an emergency event, and cause an alarm to be output to notify a user of an occurrence of the emergency event based on the received event data, where the alarm is output to a space in which the alerting device is located.

A first responder may be on-duty during a period of time during a day. The on-duty period may be referred to as a shift. During the on-duty period, the first responder may be waiting to respond to an emergency event should an emergency event occur.

For some first responders, the on-duty period may occur while they are not at a designated station. A designated station may be, for example, a fire station for a firefighter, an ambulance bay for a paramedic/EMT, a police station for a law enforcement officer, etc. For example, a firefighter may have a designated fire station at which they respond to an emergency event from. However, in some instances, first responders may be on duty but not at their designated station (e.g., they may be at home).

In such an instance, first responders who are on duty but not at their designated station may rely on a radio, hand-held pager, and/or a mobile device in order to be alerted to an emergency event that is occurring. Such devices can alert the first responder so they can get to their designated station or respond directly to a scene of an emergency event.

However, in some instances, a radio, hand-held pager, and/or mobile device may not provide a sufficient alert for the first responder. For example, if the radio, hand-held pager, and/or mobile device cease working properly, the first responder may not be notified of the emergency event and could miss responding to the emergency event. Additionally, as mentioned above, the first responder may be on duty during a shift that occurs overnight. If the radio, hand-held pager, and/or mobile device are not loud enough to alert the first responder (e.g., wake them up if they are asleep), the first responder may not be notified of the emergency event and could miss responding to the emergency event. Such scenarios can lead to more dangerous and/or impactful repercussions as a result of an emergency event.

In addition, current in-house devices, such as smart speakers and the like, include security and firmware such that information is unable to be pushed to the devices except through authorized parties. For example, such security and firmware can prevent advertisements from being pushed to the devices. However, such security and firmware also prevents event information relating to an emergency event from also being pushed to current in-house devices.

Notifying a user of an emergency event, according to the present disclosure, can allow for a device to cause an alarm using various mechanisms to ensure that the user is notified of an occurrence of an emergency event. Such a device can provide a mechanism independent of a radio, hand-held pager, and/or mobile device. Accordingly, the user can be notified of an emergency event occurring, especially at night and/or if other notification mechanisms (e.g., radio, hand-held pager, and/or mobile device) are not working, allowing for a more efficient notification mechanism, providing for safer outcomes to emergency events as compared with previous approaches.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1, and a similar element may be referenced as 202 in FIG. 2.

As used herein, "a", "an", or "a number of" something can refer to one or more such things, while "a plurality of" something can refer to more than one such things. For example, "a number of components" can refer to one or more components, while "a plurality of components" can refer to more than one component.

Figure 1:
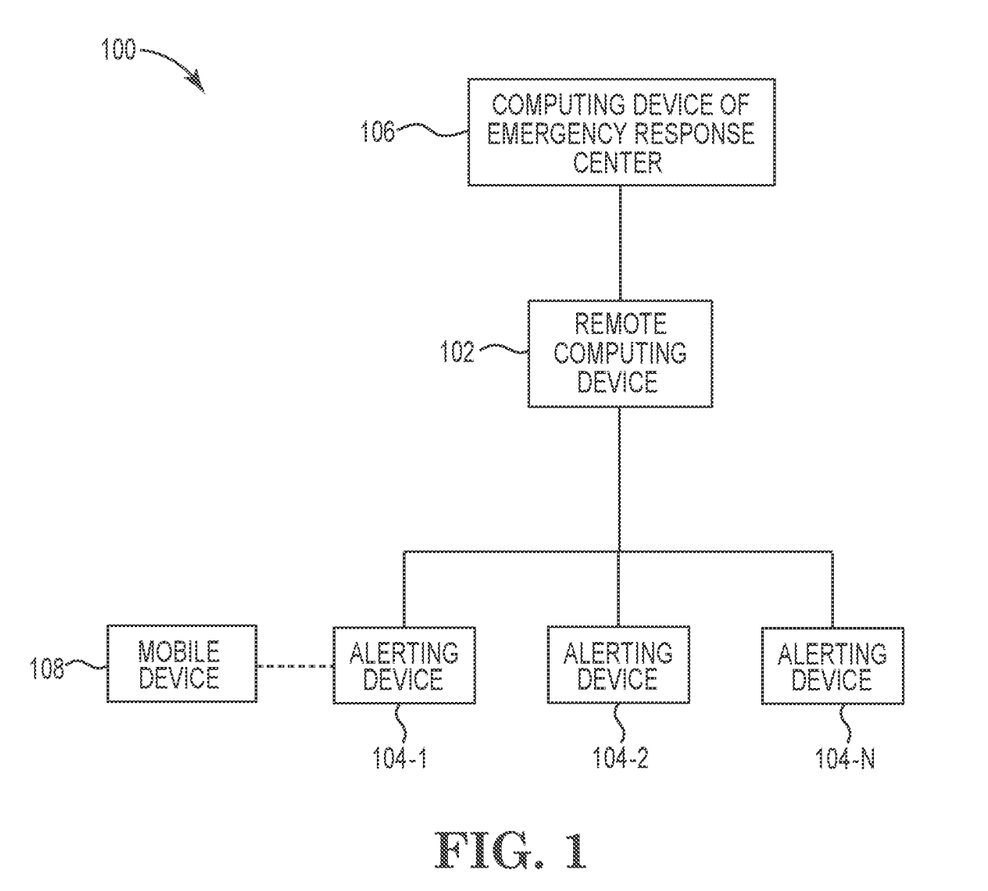
FIG. 1 is an example of a system for notifying a user of an emergency event, in accordance with one or more embodiments of the present disclosure.

FIG. 1 is an example of a system 100 for notifying a user of an emergency event, in accordance with one or more embodiments of the present disclosure. The system 100 can include a remote computing device 102, alerting devices 104-1, 104-2, 104-N (referred to collectively as alerting devices 104), a computing device 106 of an emergency response center, and a mobile device 108.

As mentioned above, a user (e.g., a first responder) may have an alerting device 104-1, 104-2, 104-N in their house. For example, a first user (e.g., a firefighter) may have alerting device 104-1 in their house, a second user (e.g., a paramedic) may have alerting device 104-2 in their house, etc. The alerting devices 104 can notify the users' of an emergency event by causing an alarm to be output, as is further described herein.

As illustrated in FIG. 1, the alerting devices 104 can be connected to a remote computing device 102. The remote computing device 102 can be a standalone computing device, a computing system, a cloud computing platform, etc. that is remotely located from the alerting devices 104 and the computing device 106. As used herein, the term "computing device" refers to an electronic system having a processing resource, memory resource, and/or an application-specific integrated circuit (ASIC) that can process information. Examples of computing devices can include, for instance, a laptop computer, a notebook computer, a desktop computer, an All-In-One (AIO) computing device, a server, networking equipment (e.g., router, switch, etc.), and/or a mobile device, among other types of computing devices.

As illustrated in FIG. 1, the remote computing device 102 can be connected to the alerting devices 104 as well as the computing device 106. Such devices can be connected via a network relationship. Examples of such a network relationship can include a local area network (LAN), wide area network (WAN), personal area network (PAN), a distributed computing environment (e.g., a cloud computing environment), storage area network (SAN), Metropolitan area network (MAN), a cellular communications network, Long Term Evolution (LTE), visible light communication (VLC), Bluetooth, Worldwide Interoperability for Microwave Access (WiMAX), Near Field Communication (NFC), infrared (IR) communication, Public Switched Telephone Network (PSTN), radio waves, and/or the Internet, among other types of network relationships.

The computing device 106 can be, for example, a computing device utilized by an emergency response center (e.g., a 911 dispatch center) for emergency services. For instance, a person can dial an emergency telephone number in response to an emergency event occurring to report the emergency event and provide information about the emergency event, and such a call may be routed to the emergency response center having the computing device 106. While the emergency response center can accordingly dispatch emergency service personnel, information received by the emergency response center at the computing device 106 can be transmitted to the remote computing device 102. Such information can be emergency event data. Accordingly, the remote computing device 102 can receive the emergency event data from the computing device 106.

Additionally, although the computing device 106 is described above as being associated with an emergency response center, embodiments of the present disclosure are not so limited. For example, the computing device 106 may be associated with a third-party service associated with a dispatcher for emergency services. Such emergency event data may be transmitted from the emergency response center to the third-party service having the computing device 106, and the emergency event data may be transmitted by the computing device 106 to the remote computing device 102.

As mentioned above, the remote computing device 102 can receive the emergency event data from the computing device 106. Emergency event data can include information describing an emergency event, such as a location of the emergency event, an emergency event type (e.g., an accident, a disaster, medical emergency, fire, crime, etc.), a severity level of the emergency event (e.g., minor, major, etc.), an emergency event responder type (e.g., firefighters, paramedics, EMTs, law enforcement officers, etc.), and/or an emergency event responder unit sub-type (e.g., a ladder engine for firefighters, a biohazard medical team, detective for law enforcement officer, etc.). For example, a user may call the emergency response center associated with the computing device 106 to report a fire and give information about the fire, such as the location of the fire and its severity. The computing device 106 can generate the emergency event data, such as the emergency event type (e.g., a fire), the geographic location of the fire, severity level of the fire, the emergency event responder type (e.g., firefighters and paramedics), and/or an emergency event responder unit sub-type (e.g., fire engines, ladder trucks, an ambulance, and specialized biohazard medical EMTS, etc.), and transmit the emergency event data to the remote computing device 102. Accordingly, the remote computing device 102 can receive the emergency event data from the computing device 106.

Utilizing the received emergency event data, the remote computing device 102 can generate event data. Event data can refer to synthesized emergency event data for use by an alerting device. For example, the remote computing device 102 can synthesize emergency event data by generating text-to-speech files, audio files, generating instructions to cause alerts (e.g., visible alerts), etc., as is further described herein.

For instance, the remote computing device 102 can generate the event data by generating an audio file that can cause an alerting device to audibly output text-to-speech information related to the emergency event. The audio file can include text-to-speech information related to the emergency event. For example, the remote computing device 102 can convert text information (e.g., describing the emergency event as a fire, its severity level, and its location) to speech in an audio file utilizing a text-to-speech algorithm. The audio file can be, for example, .WAV, .MP3, .AAC, and/or any other type of audio file.

In some examples, the remote computing device 102 can generate the event data by generating an audio file that can cause an alerting device to audibly output a tone related to the emergency event. For example, the remote computing device 102 can generate an audio file having a continuous tone based on the emergency event being a fire, generate an audio file having a repeating on/off tone based on the emergency event being a medical emergency, generate an audio file having a tone with a repeated increasing and decreasing pitch based on the emergency event being a crime, etc. The audio file can be, for example, .WAV, .MP3, .AAC, and/or any other type of audio file.

Although the remote computing device 102 is described above as generating event data including an audio file to output text-to-speech information, embodiments of the present disclosure are not so limited. For example, the remote computing device 102 can synthesize emergency event data, which may include text information, into event data and transmit the event data to the alerting devices 104. Accordingly, in some examples, the alerting devices 104 can generate an audio file that can be utilized by the alerting devices 104 to audibly output text-to-speech information related to the emergency event using the event data. For example, an alerting device 104-1 can convert text information (e.g., describing the emergency event as a fire, its severity level, and its location) included in event data received from the remote computing device 102 to speech in an audio file utilizing a text-to-speech algorithm. The audio file can be, for example, .WAV, .MP3, .AAC, and/or any other type of audio file. Such text-to-speech information can be audibly output by the alerting device 104-1, as is further described in connection with FIG. 2.

The remote computing device 102 can generate the audio file to audibly output a tone and/or text-to-speech information related to the emergency event based on a configuration of the alerting devices 104. For example, the remote computing device 102 can include configuration settings for each of the alerting devices 104 such that the remote computing device 102 can determine the text-to-speech information and/or type of audible tone (e.g., continuous, repeating, variable pitch, etc.) and which alerting device 104 the generated audio file is for.

In some examples, the remote computing device 102 can generate the event data by generating instructions that can cause an alerting device to emit a visible light related to the emergency event. For example, the remote computing device 102 can generate instructions to cause a light emission device to emit light to notify a user of the emergency event. In some examples, the light pattern and/or color can be based on the emergency event type. For example, the instructions can cause the light emission device to emit a flashing red light based on the emergency event being a fire, cause the light emission device to emit a continuous yellow light based on the emergency event being a medical emergency, cause the light emission device to emit a flashing blue light based on the emergency event being a crime, etc.

The remote computing device 102 can generate the instructions to emit the visible light related to the emergency event based on a configuration of the alerting devices 104. For example, the remote computing device 102 can include configuration settings for each of the alerting devices 104 such that the remote computing device 102 can determine the type of light emission (e.g., color, pattern, etc.) and which alerting device 104 the generated instructions are for.

As mentioned above, the event data can include the location of the emergency event. The location of the emergency event can be a location that is different from a location in the space in which the alerting device 104 is located. For example, the emergency event may take place in a factory that is in a different geographic location than the location (e.g., the home) an alerting device 104-1 is located in.

Once the remote computing device 102 has generated the event data, the remote computing device 102 can transmit the event data to an alerting device 104-1, 104-2, 104-N. The event data can cause the alerting device 104-1, 104-2, 104-N to output an alarm to notify a user of an occurrence of the emergency event based on the transmitted data, where the alarm is output to a space in which the alerting device 104-1, 104-2, 104-N is located, as is further described herein.

In some examples, the remote computing device 102 can transmit the event data to alerting devices 104 based on a configuration of the alerting devices 104. For example, the alerting device 104-1 may be a device associated with a user who is a firefighter and the alerting device 104-2 may be a device associated with a law enforcement officer. The alerting device 104-1 may be configured such that the remote computing device 102 transmits event data related to emergency events in which a firefighter is to be dispatched (e.g., a fire) to the alerting device 104-1 but not to alerting device 104-2. Similarly, the alerting device 104-2 may be configured such that the remote computing device 102 transmits event data related to emergency events in which a law enforcement officer is to be dispatched (e.g., a crime) to the alerting device 104-2 but not to alerting device 104-1. The configuration of the alerting devices 104 may be saved via configuration settings and transmitted to the remote computing device 102, as is further described herein.

As mentioned above, the alerting devices 104 can receive the event data from the remote computing device 102. Accordingly, the alerting devices 104 can cause an alarm to be output to notify a user (e.g., a first responder) of an occurrence of an emergency event based on the received event data. The alarm can be output to a space in which the alerting device is located via an audio output device, light emission device, and/or vibration device, as is further described in connection with FIG. 2.

As mentioned above, the alerting devices 104 can be configurable based on a type of user. For example, a firefighter may employ alerting device 104-1, a law enforcement officer may employ alerting device 104-2, etc. Accordingly, the alerting devices 104 may be configurable for use by such first responders utilizing the remote computing device 102 and/or the mobile device 108.

In some examples, the alerting devices 104 are configurable via the remote computing device 102. For instance, the remote computing device 102 may set configuration settings for the alerting device 104-1 based on the alerting device 104-1 being used by a firefighter. Such configuration settings may include a unique device identifier for the alerting device 104-1, types of emergency events to which the user of alerting device 104-1 may respond (e.g., fires), text-to-speech information, type of audible tone (e.g., continuous, repeating, variable pitch, etc.), type of light emission (e.g., color, pattern, etc.), etc. For example, the configuration settings of alerting device 104-1 may include the unique device identifier for alerting device 104-1, a continuous audible tone, and a flashing red light emission pattern for a firefighter who uses the alerting device 104-1. Additionally, the configuration settings of alerting device 104-1 may include a different unique device identifier for alerting device 104-2, a variable pitch audible tone, and a flashing blue light emission pattern for a law enforcement officer who uses the alerting device 104-2. Such configuration settings can be saved at the remote computing device 102 and transmitted to the alerting devices 104.

In some examples, the alerting devices 104 are configurable via a mobile device 108. For instance, as illustrated in FIG. 1, the mobile device 108 can connect to an alerting device 104-1. The mobile device 108 may set configuration settings for the alerting device 104-1 based on the alerting device 104-1 being used by a firefighter. Such configuration settings may include a unique device identifier for the alerting device 104-1, types of emergency events to which the user of alerting device 104-1 may respond (e.g., fires), text-to-speech information, type of audible tone (e.g., continuous, repeating, variable pitch, etc.), type of light emission (e.g., color, pattern, etc.), etc. For example, the configuration settings of alerting device 104-1 may include the unique device identifier for alerting device 104-1, a continuous audible tone, and a flashing red light emission pattern for a firefighter who uses the alerting device 104-1. In another example, although not illustrated in FIG. 1, the mobile device 108 (or a different mobile device) may connect to the alerting device 104-2 to set the configuration settings for alerting device 104-2 (which may include a different unique device identifier for alerting device 104-2) including a variable pitch audible tone, and a flashing blue light emission pattern for a law enforcement officer who uses the alerting device 104-2. Such configuration settings can be saved at the alerting devices 104 and transmitted by the alerting devices 104 to the remote computing device 102, and/or saved at the mobile device 108 and transmitted by the mobile device 108 to the remote computing device 102. Configuration settings may be set by a user via a user interface of the mobile device (e.g., not illustrated in FIG. 1).

The mobile device 108 can connect to the alerting devices 104 via a wired or wireless network relationship, as described above. As used herein, a mobile device can include devices that are (or can be) carried and/or worn by a user. For example, a mobile device can be a phone (e.g., a smart phone), a tablet, a personal digital assistant (PDA), smart glasses, and/or a wrist-worn device (e.g., a smart watch), among other types of mobile devices.

Figure 2:
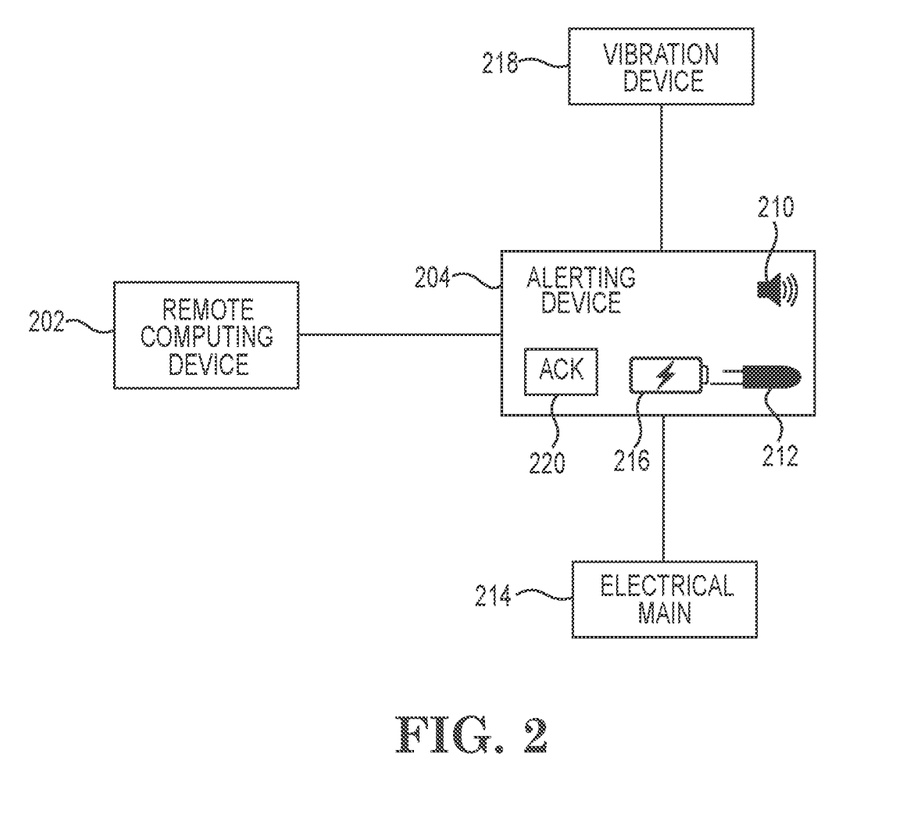
FIG. 2 is an example of an alerting device including an audio output device and a light emission device for notifying a user of an emergency event, in accordance with one or more embodiments of the present disclosure.

FIG. 2 is an example of an alerting device 204 including an audio output device 210 and a light emission device 212 for notifying a user of an emergency event, in accordance with one or more embodiments of the present disclosure. The alerting device 204 can further include a charge storage device 216.

As previously described in connection with FIG. 1, the alerting device 204 can receive event data that is associated with an emergency event from a remote computing device 202. For example, the event data can include audio files for output by an audio output device 210, instructions to emit a visible light from a light emission device 212, and/or cause a vibration device 218 to be enabled, as is further described herein.

As illustrated in FIG. 2, the alerting device 204 can include an audio output device 210. The audio output device 210 can be, for example, a speaker.

In some examples, the alerting device 204 can cause an alarm to be output into a space in which the alerting device 204 is located by emitting, by the audio output device 210, text-to-speech information associated with the emergency event. For example, the alerting device 204 can cause the audio output device 210 to audibly emit speech from text stating the emergency event is a fire, it's a severe fire, the location of the fire (e.g., a factory; and can recite the address of the location of the emergency event), etc. Such audible speech can be utilized to notify the user (e.g., a firefighter) of the occurrence of the emergency event. Such text-to-speech information may be generated by the remote computing device 202 or by the alerting device 204, as previously described in connection with FIG. 1.

In some examples, the alerting device 204 can cause an alarm to be output into a space in which the alerting device 204 is located by emitting, by the audio output device 210, a tone associated with the emergency event. For example, the alerting device 204 can cause the audio output device 210 to audibly emit a repeating variable pitch tone that is associated with the emergency event being a fire. The audible tone can serve to notify the user (e.g., a firefighter) of the occurrence of the emergency event as well as its type (e.g., a fire).

The alerting device 204 can further include a light emission device 212. The light emission device 212 can be, for example, a light emitting diode (LED), an LED lamp, a fluorescent lamp, a halogen lamp, an incandescent bulb, and/or any other type of light emission device.

In some examples, the alerting device 204 can cause an alarm to be output into a space in which the alerting device 204 is located by emitting, by the light emission device 212, light associated with the emergency event. For example, the alerting device 204 can cause the light emission device 212 to visibly emit red flashing light patterns to indicate to the user that the emergency event is a fire. Such light emission can be utilized to notify the user (e.g., a firefighter) of the occurrence of the emergency event.

As illustrated in FIG. 2, the alerting device 204 can be connected to a vibration device 218. The vibration device 218 can be a device that emits mechanical oscillations about an equilibrium point. For example, the vibration device 218 may be located proximate to a pillow and/or located on a bed/couch such that a user who is sleeping can feel the vibration of the vibration device 218 when enabled. The vibration device 218 may be connected to the alerting device 204 via a wired and/or wireless connection/network relationship.

The alerting device 204 can enable the vibration device 218 in response to receiving the event data. For example, in response to receiving the event data from the remote computing device 202, the alerting device 204 can utilize instructions included in the event data to enable the vibration device 218. Such vibrations can be utilized to notify the user (e.g., a firefighter) of the occurrence of the emergency event.

Although the audio output device 210, light emission device 212, and vibration device 218 are described above as individually serving to notify the user of the alerting device 204 of the occurrence of the emergency event, embodiments of the present disclosure are not so limited. For example, the alerting device 204 may utilize combinations of the above notification mechanisms. For instance, the alerting device 204 may initiate output of the alarm by outputting a variable pitch audible tone, then audibly emit text-to-speech information, while simultaneously emitting flashing red lights and/or activating the vibration device 218. Utilizing such alert mechanisms can ensure that a user, who may be on-duty at home, is notified of the occurrence of the emergency event, even when the user may be sleeping or otherwise occupied and not able to be notified by other mechanisms (e.g., a radio, hand-held pager, and/or a mobile device).

Upon output of the alarm, the alerting device 204 can log the time at which the alarm began its output. For example, the alerting device 204 may cause an alarm to be output via the audio output device 210 and the light emission device 212 at 2:32 AM. The alerting device 204 can then log the time at 2:32 AM as the first time at which the alarm is output.

Additionally, the alerting device 204 can log the time at which the alarm ceases its output. For example, the alerting device 204 may begin its alarm output at 2:32 AM and cease its output at 2:36 AM. The alerting device 204 can then log the time at 2:36 AM as the second time at which the alarm ceases its output.

The log of the time at which the alarm is output and the time at which the alarm ceases to output can be transmitted to the remote computing device 202. Utilizing the log, the remote computing device 202 can generate a report indicating how long the alarm was output, at what times, etc. Such a report may be utilized to determine different and/or more effective alarming schemes, among other examples.

In some examples, the time at which the alarm ceases its output may be a predetermined amount of time. For example, the alarm may be output for 15 minutes.

In some examples, the alerting device 204 can receive an input acknowledging the alarm. As illustrated in FIG. 2, the alerting device 204 can include an acknowledge input 220. The acknowledge input 220 may be a button, can be displayed on a user interface of a display included with the alerting device 204, etc. A user being notified of the occurrence of the emergency event can provide an input to the alerting device 204 via the acknowledge input 220. In some examples, in response to receiving the input, the alerting device 204 can log the time (e.g., at 2:36 AM) as the second time at which the alarm ceases its output in response to receiving the acknowledge input 220.

Although the alerting device 204 is described above as receiving an input acknowledging the alarm via the acknowledge input 220, embodiments of the present disclosure are not so limited. For instance, in some examples, the alerting device 204 can receive the input acknowledging the alarm via a mobile device (e.g., mobile device 108, previously described in connection with FIG. 1) connected to the alerting device 204. For example, the user may be notified of the occurrence of the emergency event and can provide an input acknowledging the alarm via a user interface of the mobile device, and the mobile device can transmit a signal to the alerting device 204 to cause the alerting device 204 to log the time as the second time at which the alarm ceases its output in response to receiving the signal from the mobile device.

The alerting device 204 can be connected to an electrical main 214. Additionally, the alerting device can include a charge storage device 216. The charge storage device 216 can be a battery, a capacitor, etc. The electrical main 214 can provide power to the alerting device 204.

However, in some examples, the electrical main 214 may fail. For example, during a storm, the electrical main 214 may fail such that power may be lost to the user's house (e.g., and to the alerting device 204). In such an instance, the charge storage device 216 can provide power to the alerting device 204 in response to the electrical main 214 failing. Accordingly, the charge storage device 216 can ensure that the alerting device 204 is able to provide an alert for a user in the event an emergency event occurs.

Notifying a user of an emergency event, according to the present disclosure, can allow for an alerting device that can provide various types of alarms to be output to notify a user of an occurrence of an emergency event. Such alarms may be provided even when power to the user's house is out, a radio, hand-held pager, and/or a mobile device are not loud enough to notify the user or they fail. Accordingly, the user may always be notified of an emergency event allowing the user to respond, providing for safer outcomes to emergency events as compared with previous approaches.

Figure 3:
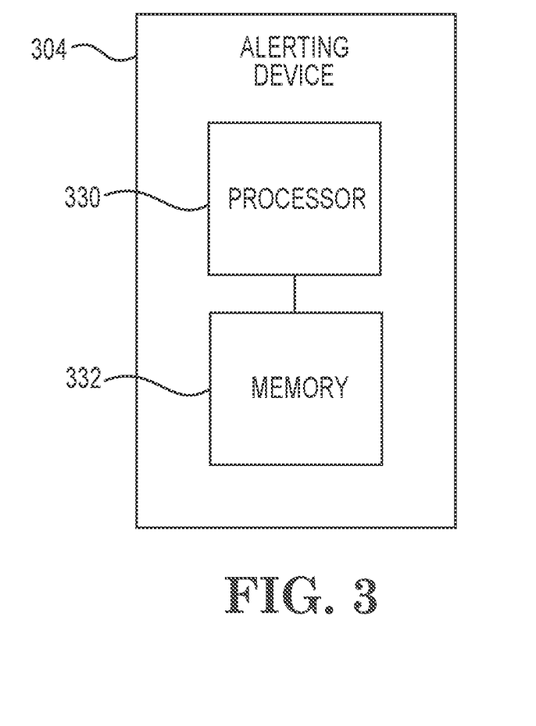
FIG. 3 is an example of an alerting device for notifying a user of an emergency event, in accordance with one or more embodiments of the present disclosure.

FIG. 3 is an example of an alerting device 304 for notifying a user of an emergency event, in accordance with one or more embodiments of the present disclosure. As illustrated in FIG. 3, the alerting device 304 can include a memory 332 and a processor 330 for notifying a user of an emergency event, in accordance with the present disclosure.

The memory 332 can be any type of storage medium that can be accessed by the processor 330 to perform various examples of the present disclosure. For example, the memory 332 can be a non-transitory computer readable medium having computer readable instructions (e.g., executable instructions/computer program instructions) stored thereon that are executable by the processor 330 for notifying a user of an emergency event in accordance with the present disclosure.

The memory 332 can be volatile or nonvolatile memory. The memory 332 can also be removable (e.g., portable) memory, or non-removable (e.g., internal) memory. For example, the memory 332 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical storage, and/or a magnetic medium such as magnetic cassettes, tapes, or disks, among other types of memory.

Further, although memory 332 is illustrated as being located within alerting device 304, embodiments of the present disclosure are not so limited. For example, memory 332 can also be located internal to another computing resource (e.g., enabling computer readable instructions to be downloaded over the Internet or another wired or wireless connection).

The processor 330 may be a central processing unit (CPU), a semiconductor-based microprocessor, and/or other hardware devices suitable for retrieval and execution of machine-readable instructions stored in the memory 332.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. An alerting device for notifying a user of an emergency event, comprising:
   a memory; and
   a processor configured to execute executable instructions stored in the memory to:
   receive event data from a remote computing device, wherein:
   the event data is associated with an emergency event; and
   the event data includes an emergency event type, a severity level of the emergency event, and an emergency event responder type; and
   cause an alarm to be output to notify a user of an occurrence of the emergency event based on the received event data, wherein:
   the alarm is output based on the emergency event type, the severity level of the emergency event, and the emergency event responder type to a space in which the alerting device is located; and
   the alerting device includes configuration settings for a type of the alarm to be output, wherein the configuration settings are configured based on a type of user of the alerting device that is responding to the emergency event.

2. The alerting device of claim 1, wherein the alerting device further includes an audio output device.

3. The alerting device of claim 2, wherein the processor is configured to execute the instructions to cause the alarm to be output by causing the audio output device to emit text-to-speech information associated with the emergency event to notify the user of the occurrence of the emergency event.

4. The alerting device of claim 2, wherein the processor is configured to execute the instructions to cause the alarm to be output by causing the audio output device to emit a tone associated with the emergency event to notify the user of the occurrence of the emergency event.

5. The alerting device of claim 1, wherein:
the alerting device further includes a light emission device; and
the processor is configured to execute the instructions to cause the alarm to be output by causing the light emission device to emit light to notify the user of the occurrence of the emergency event.

6. The alerting device of claim 1, wherein the processor is configured to execute the instructions to generate, based on the event data, an audio file including text-to-speech information related to the emergency event and cause the alarm to be output by audibly outputting the text-to-speech information.

7. The alerting device of claim 1, wherein:
the alerting device is powered by an electrical main;
the alerting device further includes a charge storage device; and
the charge storage device is configured to provide power to the alerting device in response to the electrical main failing.

8. The alerting device of claim 1, wherein the processor is configured to receive an input acknowledging the alarm.

9. The alerting device of claim 1, wherein the processor is configured to execute the instructions to:
log at least one of a first time at which the alarm is output and a second time at which the alarm ceases to output; and
transmit the first time and the second time to the remote computing device.

10. The alerting device of claim 1, wherein:
the event data includes a location of the emergency event; and
the location of the emergency event is a location that is different from a location of the space in which the alerting device is located.

11. A remote computing device for notifying a user of an emergency event, comprising:
a memory; and
a processor configured to execute executable instructions stored in the memory to:
configure configuration settings of an alerting device for a type of alarm to be output by the alerting device, wherein the configuration settings are based on a type of user of the alerting device that is responding to an emergency event;
receive emergency event data from a computing device associated with an emergency response center, wherein:
the emergency event data is associated with the emergency event; and
the emergency event data includes an emergency event type, a severity level of the emergency event, and an emergency event responder type;
generate event data based on the received emergency event data; and
transmit the event data to the alerting device to cause the alerting device to output an alarm to notify a user of an occurrence of the emergency event based on the transmitted event data, wherein the alarm is output based on the emergency event type, the severity level of the emergency event, and the emergency event responder type to a space in which the alerting device is located.

12. The remote computing device of claim 11, wherein the processor is configured to execute the instructions to generate the event data by generating an audio file to cause the alerting device to audibly output text-to-speech information related to the emergency event.

13. The remote computing device of claim 11, wherein the processor is configured to execute the instructions to generate the event data by generating an audio file to cause the alerting device to audibly output a tone related to the emergency event.

14. The remote computing device of claim 11, wherein the processor is configured to execute the instructions to generate the event data by generating instructions to cause the alerting device to emit a visible light related to the emergency event.

15. The remote computing device of claim 11, wherein:
the emergency event data includes a location of the emergency event; and
the location of the emergency event is a location that is different from a location of the remote computing device.

16. A system for notifying a user of an emergency event, comprising:
a remote computing device configured to:
receive emergency event data from a computing device associated with an emergency response center, wherein:
the emergency event data is associated with an emergency event; and
the emergency event data includes an emergency event type, a severity level of the emergency event, and an emergency event responder type;
generate event data based on the received emergency event data; and
transmit the event data to an alerting device; and
the alerting device configured to:
receive the event data from the remote computing device; and
cause an alarm to be output based on the emergency event type, the severity level of the emergency event, and the emergency event responder type to notify a user of an occurrence of the emergency event based on the received event data, wherein the alerting device includes configuration settings for a type of the alarm to be output, wherein the configuration settings are configured based on a type of user of the alerting device that is responding to the emergency event.

17. The system of claim 16, wherein the emergency event data includes at least one of:
a location of the emergency event; and
an emergency event responder unit sub-type.

18. The system of claim 16, wherein:
the alerting device is connected to a vibration device; and the alerting device is configured to enable the vibration device in response to receiving the event data, wherein the vibration device is configured to notify the user of the occurrence of the emergency event.

19. The system of claim 16, wherein the configuration settings of the alerting device are configurable via the remote computing device.

20. The system of claim 16, wherein the configuration settings of the alerting device are configurable via a mobile device connected to the alerting device.

* * * * *